US 8,166,162 B2

(12) United States Patent
Triano et al.

(10) Patent No.: US 8,166,162 B2
(45) Date of Patent: Apr. 24, 2012

(54) ADAPTIVE CUSTOMER-FACING INTERFACE RESET MECHANISMS

(75) Inventors: Stephen Francis Triano, Kearny, NJ (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 323 days.

(21) Appl. No.: 12/571,503

(22) Filed: Oct. 1, 2009

(65) Prior Publication Data

US 2011/0082926 A1 Apr. 7, 2011

(51) Int. Cl.
G06F 15/16 (2006.01)
G06F 12/00 (2006.01)
(52) U.S. Cl. ........................ 709/224; 709/250
(58) Field of Classification Search .......... 709/223–226, 709/229, 250
See application file for complete search history.

(56) References Cited

U.S. PATENT DOCUMENTS

| | | | | |
|---|---|---|---|---|
| 5,913,035 A * | 6/1999 | Waters et al. | ................. | 709/223 |
| 7,114,146 B2 * | 9/2006 | Zhang et al. | ................. | 717/106 |
| 7,293,198 B2 * | 11/2007 | Strickland et al. | ............. | 714/15 |
| 7,904,553 B1 * | 3/2011 | Ham et al. | ................. | 709/224 |
| 7,969,987 B1 * | 6/2011 | Hansen et al. | ........... | 370/395.21 |
| 7,986,246 B2 * | 7/2011 | Angelis et al. | .......... | 340/870.02 |
| 2002/0143920 A1 * | 10/2002 | Dev et al. | ..................... | 709/223 |
| 2010/0296647 A1 * | 11/2010 | Chan | ........................ | 379/413.02 |

OTHER PUBLICATIONS

U.S. Appl. No. 12/644,456 to J. Fan et al., filed Dec. 22, 2009.
U.S. Appl. No. 12/262,547 to S. Griesmer et al., filed Oct. 31, 2008.

* cited by examiner

Primary Examiner — Zarni Maung
(74) Attorney, Agent, or Firm — Greenblum & Bernstein, P.L.C.

(57) ABSTRACT

Automating event detection in a communications network includes correlating reports, issued by users experiencing an outage or a performance degradation for a service provided by a service provider, to identify a network element associated with the outage or the performance degradation. It is determined whether a predetermined threshold is crossed based on the reports. A customer-facing portion of the network element associated with the reports is adaptively reset, based on determining whether the predetermined threshold is crossed.

18 Claims, 3 Drawing Sheets

ADAPTIVE CUSTOMER-FACING INTERFACE RESET MECHANISMS

BACKGROUND

1. Field of the Disclosure

The present disclosure relates to the field of network event detection. More particularly, the present disclosure relates to systems and methods for adaptively resetting customer-facing interfaces.

2. Background Information

Often times, network equipment such as a digital subscriber line access multiplexer (DSLAM) may require a reset of associated customer-facing portions, such as customer interface cards. This may occur when a customer interface card is replaced and customers connected to the replaced customer interface card lose synchronization and consequently, lose network connectivity. In other cases, synchronization is lost due to older customer premise equipment or unreliable switch behavior. A network connectivity outage, termed a "silent failure", is typically detected manually. Subsequent to a manual detection, a customer care representative may contact a network technician to manually reconfigure the customer interface card corresponding to the impacted customers (i.e., customer who have experienced a service outage, service interruption or performance degradation for the service). Manually detecting silent failures and manually reconfiguring customer interface cards is a resource-intensive process and may require significant expenditure in terms of human labor costs and time to resolve the above-noted issues.

DETAILED DESCRIPTION

Figure 1:
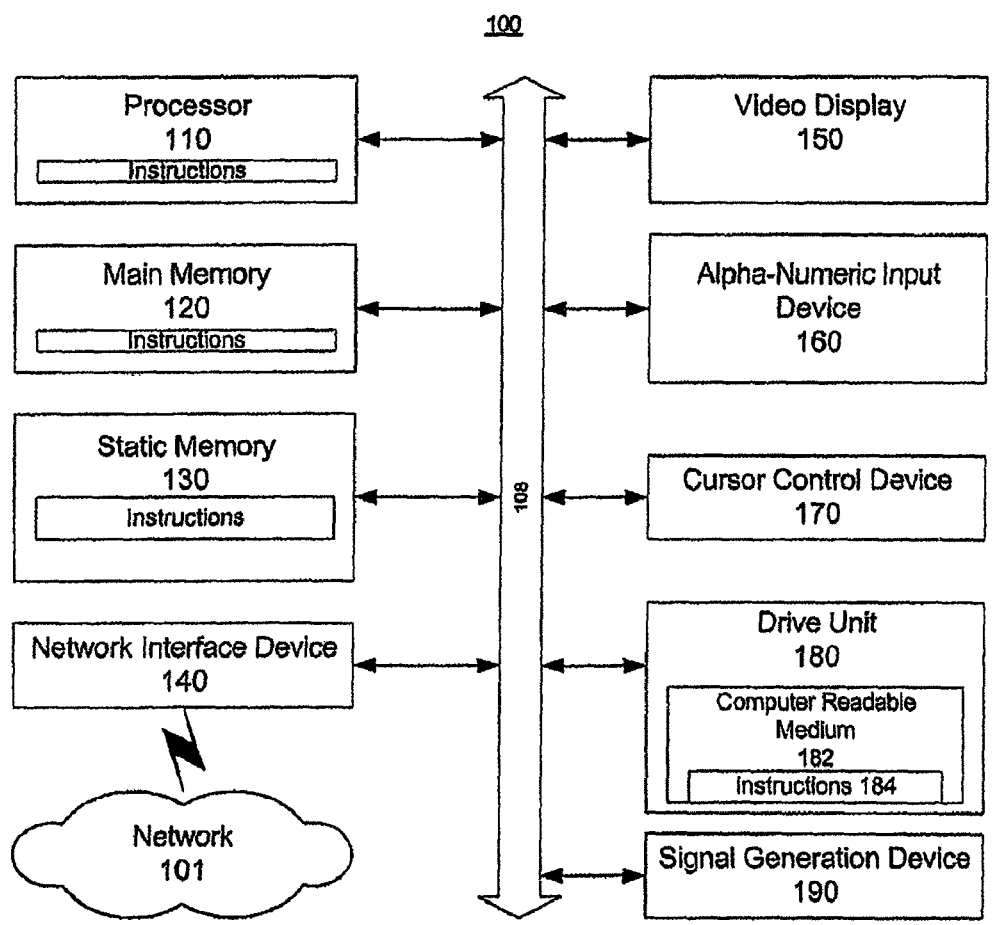
FIG. 1 shows an exemplary general computer system that includes a set of instructions for adaptively resetting customer-facing interfaces.

In view of the foregoing, the present disclosure, through one or more of its various aspects, embodiments and/or specific features or sub-components, is thus intended to bring out one or more of the advantages as specifically noted below.

According to one aspect of the present disclosure, a method of automating event detection in a communications network includes correlating reports, issued by users experiencing at least one of an outage and a performance degradation for a service provided by a service provider, to identify a network element associated with the at least one of the outage and the performance degradation. The method includes determining whether a predetermined threshold is crossed based on the reports. The method includes adaptively resetting a customer-facing portion of the network element associated with the reports, based on determining whether the predetermined threshold is crossed.

According to another aspect of the present disclosure, the method includes retesting the network element to determine whether an issue associated with the at least one of the outage and the performance degradation is resolved.

According to yet another aspect of the present disclosure, the method includes creating a network ticket when retesting results in a determination that the issue associated with the at least one of the outage and the performance degradation is not resolved.

According to still another aspect of the present disclosure, the service comprises providing network connectivity.

According to one aspect of the present disclosure, the reports are received via at least one of: the Internet, postal mail, a public switched telephone network and an intranet.

According to another aspect of the present disclosure, the customer-facing portion of the network element comprises a customer interface card.

According to yet another aspect of the present disclosure, the network element comprises at least one of: a digital subscriber line access multiplexer, a router, a switch and an interface device between a public switched telephone network and a packet switched data network.

According to still another aspect of the present disclosure, the predetermined threshold specifies a number of customers that do not experience the at least one of the outage and the performance degradation for the service provided by the service provider.

According to one aspect of the present disclosure, the predetermined threshold specifies a number of the reports that specify an issue falling within a defined criteria.

According to another aspect of the present disclosure, the predetermined threshold specifies a number of customers that experience the at least one of the outage and the performance degradation for the service provided by the service provider.

According to yet another aspect of the present disclosure, the method includes applying logic based on the reports.

According to still another aspect of the present disclosure, the logic specifies a configuration of at least one of the customer-facing portion of the network element and the network element.

According to one aspect of the present disclosure, the logic determines whether a type of issue causing the at least one of the outage and the performance degradation is related to at least one of hardware or software.

According to another aspect of the present disclosure, the method includes implementing a course of action based on at least one of the predetermined threshold and the logic.

According to yet another aspect of the present disclosure, the course of action comprises waiting for a time period prior to adaptively resetting the customer-facing portion of the network element associated with the reports.

According to still another aspect of the present disclosure, the course of action comprises obtaining a snapshot of at least one of the customer-facing portion of the network element and the network element.

According to one aspect of the present disclosure, the snapshot comprises at least one of: a configuration for the network element, a configuration for the customer-facing portion of the network element, memory values for the network element, memory values for the customer-facing portion of the network element, register values for the network element, register values for the customer-facing portion of the network element, performance parameters for the network element, performance parameters for the customer-facing portion of the network element, error counts for the network element and error counts for the customer-facing portion of the network element.

According to another aspect of the present disclosure, the method includes adaptively resetting the network element.

According to one aspect of the present disclosure, system for automating event detection in a communications network includes a correlator that correlates reports, issued by users experiencing at least one of an outage and a performance degradation for a service provided by a service provider, to identify a network element associated the at least one outage and performance degradation. The system includes a business rule automator that determines whether a predetermined threshold is crossed based on the reports. The system includes a resetter that adaptively resets a customer-facing portion of the network element associated with the reports, based on determining whether the predetermined threshold is crossed.

According to one aspect of the present disclosure, at least one tangible computer readable medium, storing a computer program recorded on the at least one tangible computer readable medium, for automating event detection in a communications network includes a correlating code segment, recorded on the at least one tangible computer readable medium, that correlates reports, issued by users experiencing at least one of an outage and a performance degradation for a service provided by a service provider, to identify a network element associated with the at least one of the outage and the performance degradation. The at least one tangible computer readable medium includes a determining code segment, recorded on the at least one tangible computer readable medium, that determines whether a predetermined threshold is crossed based on the customer reports. The at least one tangible computer readable medium includes a resetting code segment, recorded on the at least one tangible computer readable medium, that adaptively resets a customer-facing portion of the network element associated with the customer reports, based on determining whether the predetermined threshold is crossed.

FIG. 1 is an illustrative embodiment of a general computer system, on which a method to provide adaptive reset of customer-facing interfaces can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

According to one aspect of the present disclosure, events related to customer-facing portions of network elements are compared to a threshold to facilitate mechanized, adaptive resets of the customer-facing portions in attempting to restore a service provided by a service provider. Events are reported by customers and are correlated to determine a common locus at which a service outage or performance degradation is occurring. The common locus is interchangeably referred to as a network element and a network node.

Figure 2:
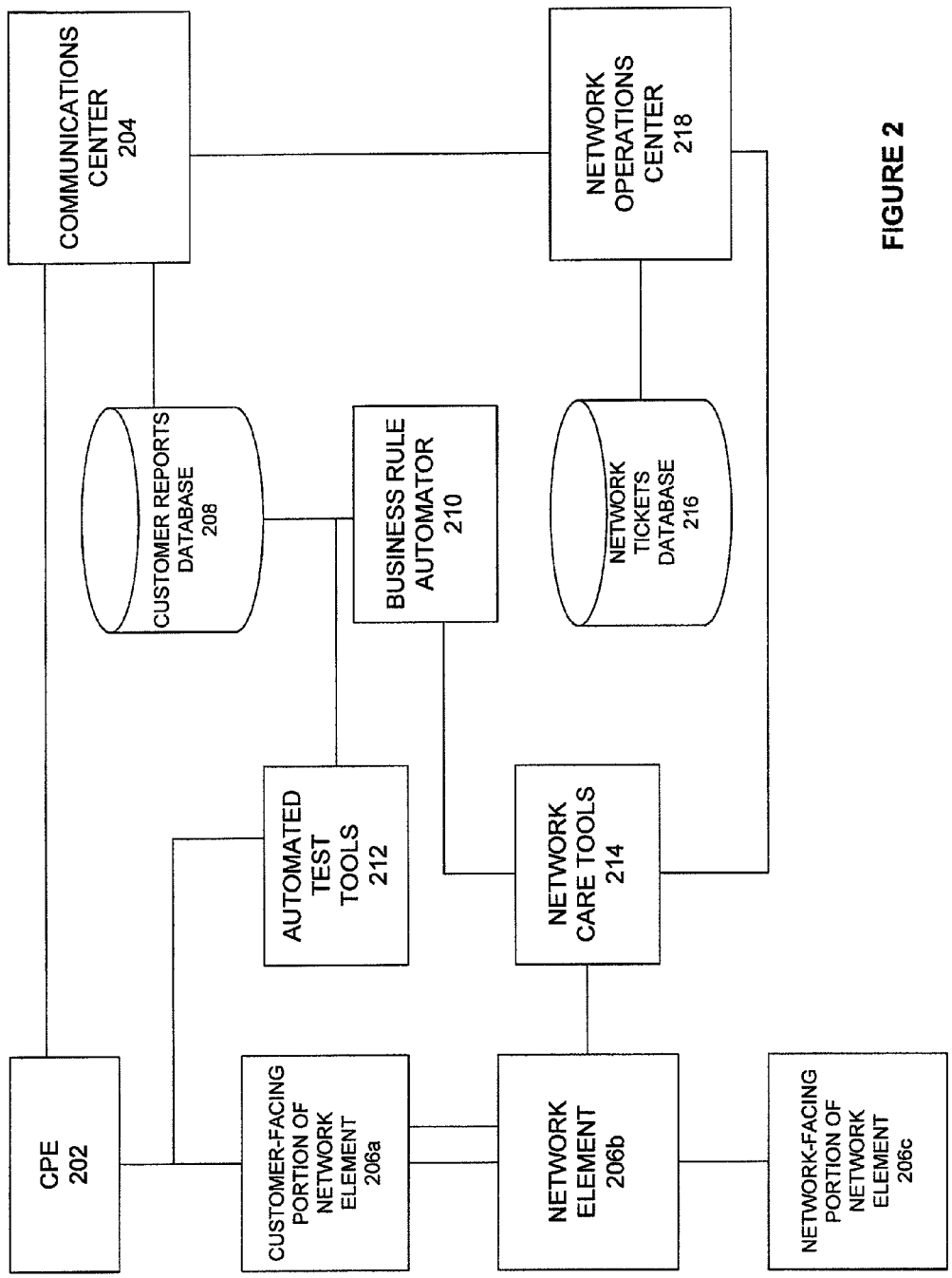
FIG. 2 shows a system diagram for adaptively resetting customer-facing interfaces, according to an aspect of the present disclosure.

In FIG. 2, a system diagram of the present disclosure is shown. A customer (not shown) corresponding to customer premise equipment 202 contacts a communications center 204 to report issues with a customer-facing portion 206a of a network element 206b. The network element 206b also has a network-facing portion 206c. Although the customer-facing portion 206a, the network element 206b and the network-facing portion 206c are shown in FIG. 2 as being three distinct components, as will be understood by one of ordinary skill in the art, either or both of the customer-facing portion 206a and the network-facing portion 206b are configurable or implementable on the network element 206b. In one embodiment, the network element 206b is a digital subscriber line access multiplexer. The customer-facing portion 206a of the network element 206b is, in one embodiment, a customer interface card.

In another embodiment, the network element is any of the following, but not limited to: a switch, a router, an optical network switch and a network gateway. In yet another embodiment, the network element is a device interfacing a voice over Internet protocol (VoIP) network and a public switched telephone network (PSTN). As will be understood by one of ordinary skill in the art, the network element 206b is any hardware device, or combination of software and hardware that provides or assists in providing the service (e.g., network connectivity) to customers.

For each contact initiated by a customer, an agent (not shown) at the communications center 204 creates a customer report. Customers contact the communications center 204 via any of the following but not limited to: telephone, email, web client, Internet-enabled chat session, cellular or mobile phone, short messaging system message, videoconference, facsimile and postal mail. Customers access the communications center 204 via any one or combination of the following networks, but not limited to: wireless networks, Internet, intranet, virtual private networks, local area networks, wide area networks, fiber optic networks and satellite networks. As will be understood by one of ordinary skill in the art, customers are enabled to contact the communications center 204 and are not limited by any communication media, any communication protocol or any communication network.

Each time a customer report detailing a customer's issues with the service provided by the service provider is generated, the customer report is stored in a customer reports database 208. A business rule automator 210 correlates the customer reports to common locus (i.e., a network node or network element). That is, logic implemented on the business rule automator 210 correlates customer identifiers indicating an origination point of each of the customer reports. Based on the business rule automator 210, the service provider is able to determine the network element 206b that is associated with a subset of the customer reports stored in the customer reports database 208.

The business rule automator 210 also stores a set of thresholds. In one embodiment, a threshold indicates a minimum number of customers for which the service (e.g., network connectivity) is maintained or a minimum number of customers for which a designated performance level for the service is maintained. In another embodiment, a threshold indicates a maximum number of customers experiencing service outages or service performance degradation. In yet another embodiment, the threshold is a ratio of customers for whom service is impacted to customers for whom service is either not impacted or is minimally impacted. As will be understood by one of ordinary skill in the art, the threshold relates to the provision of any service offered by the service provider as well as the performance of the service offered by the service provider (e.g., service outages, service performance degradation). As will also be understood by one of ordinary skill in the art, threshold logic is determined by any of the following, but not limited to: a system administrator, an agent, business rules and operating procedures and a network technician.

Based on whether one or more thresholds is crossed, which is determined by the business rule automator 210, a course of action is determined. In one embodiment, automated test tools 212 are deployed to troubleshoot issues related to the customer-facing portion 206a of the network element 206b. The automated test tools 212 perform diagnostics functions and obtain data relating any of the following, but not limited to the: a configuration, memory contents, register values, performance parameters and error counts of either or both of the customer-facing portion 206a and the network element 206b. Network test tools 214 adaptively reset either or both of the customer-facing portion 206a and the network element 206b.

Upon resetting either or both of the customer-facing portion 206a and the network element 206b, automated test tools 212 are again deployed to determine whether the customer-facing portion 206a and the network element 206b functional and providing the service provided by the service provider. If the customer receives the service satisfactorily, then in one embodiment, the customer report is archived and any ticket generated by the communications center 204 is closed. If resetting the customer-facing portion 206a of the network element 206b fails to resume the service or resume provision of the service at a satisfactory performance level, then the business rule automator 210 creates a network ticket that is stored in a network tickets database 216. A network operations center 218 deploys network care tools 214 again or in combination with a network technician to further troubleshoot the issues associated with the customer-facing portion 206a of the network element 206b and the network element 206b.

Figure 3:
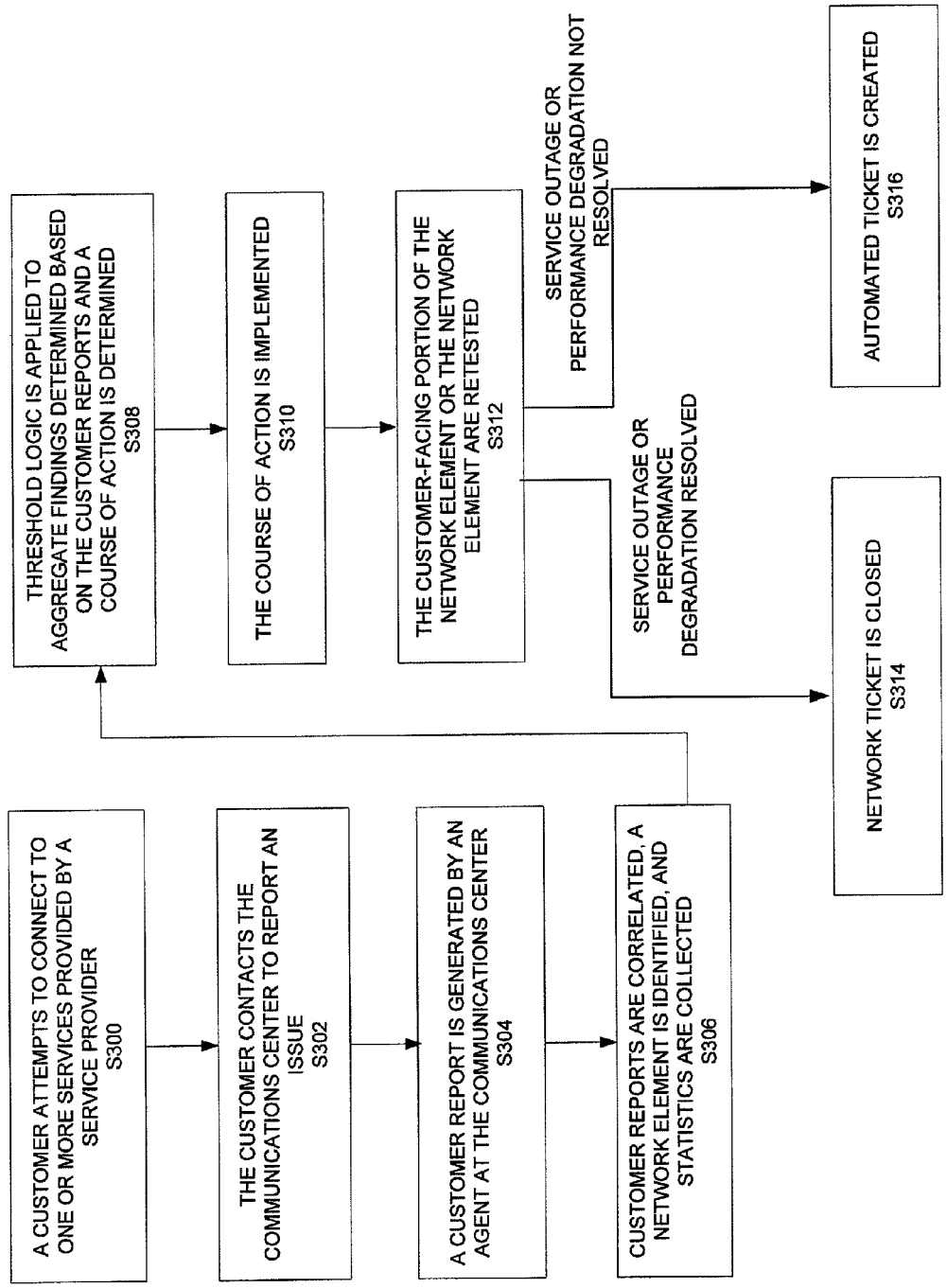
FIG. 3 shows a process flow diagram for adaptively resetting customer-facing interfaces, according to an aspect of the present disclosure.

In FIG. 3, a process flow diagram of the present disclosure is shown. In step S300, a customer attempts to connect, via customer premise equipment, to one or more services provided by the service provider. Services requiring network connectivity includes any of the following, but not limited to: Internet or network connectivity, high definition television (HDTV), television over Internet protocol (IPTV), browsing the Internet, voice of Internet protocol telephone services and email access. A customer that is experiencing a service outage or a performance degradation for the service contacts a communications center to report a problem in step S302. In step S304, a customer report is generated by an agent at the communications center. In another embodiment, the customer report is automatically generated. The customer report specifies and details the issues that the customer is facing with respect the particular product or service provided by the service provider.

In step S306, customer reports from a number of customers reporting service outages or performance degradation with respect to the above-noted services are correlated. For example, it is determined whether customers facing issues with respect to high definition television, customer experiencing issues with respect to Internet television and customers experiencing issues browsing the Internet are all connected to the same customer interface card or the same digital signal line access multiplexer. Statistics are collected by a business rule automator to aggregate and analyze findings with respect to either or both of the customer-facing portion of the network element and the network element itself. The customer reports are transmitted via at least one of: the Internet, postal mail, a public switched telephone network and an intranet. The customer reports are transmitted using a message format including any of the following, including but not limited to: an email, a telephone call, a short messaging system (SMS) message, a letter and a chat client message. The customer reports are received at any of the following, but not limited to: a personal computing device, a laptop computer and a mobile device (e.g., a smartphone, a wireless phone and a pager). As will be understood by one of ordinary skill in the art, the customer reports are deliverable via any communication network, over any communication media, in any communication format and to any device capable of receiving and/or transmitting data.

In step S308, threshold logic is applied to the aggregate findings obtained based on the customer reports. Based on whether one or more thresholds is crossed, a course of action is determined. A course of action includes, adaptively resetting either the network element or a customer-facing portion of the network element; performing an adaptive reset after waiting for a maintenance window (i.e., waiting for a network technician to arrive at the network element or the network node); and obtaining a snapshot of the configuration and parameters of either the network element and the customer-facing portion of the network element. As described above, the snapshot includes any of the following, but not limited to: the configuration of the network element, the configuration of the customer-facing portion of the network element, memory contents, register values, performance parameters and error counts. Sometimes, the card is not immediately reset because there is a maintenance window in which degraded performance is acceptable, while a network technician is called to fix the customer interface card. The network technician may need a maintenance window of time to procure the appropriate tools to test, diagnose and resolve issues associated with either or both the network element or the customer-facing portion of the network element.

In one embodiment, additional logic is applied in step S308. For example, the course of action is additionally based on a determination of whether the problem associated with the network element is a hardware or a software problem. Sometimes, a problem may appear to be related to a customer interface card, but further testing and troubleshooting indicates that the problem is related to the network element, or another device connectable to the customer interface card or the network element. In another embodiment, the course of action is based on additional logic that relates to the configuration and/or interdependence of the customer-facing portions in the network element. For example, in some digital subscriber line access multiplexers, manufacturers daisy chain customer interface cards. Accordingly, resetting a first card will, for example, affect customers associated with a second customer interface card, a third customer interface card and a fourth customer interface card. The course of action is implemented in step S310, based on the threshold logic and optionally, the additional logic applied in step S308.

In step S312, after a course of action is implement, the customer-facing portions are retested. If the customer-facing portion provides satisfactorily provides network connectivity or the service to the customer, then a network ticket is closed, in step S314. If network connectivity or the service is not restored to the customer, then an automated ticket is created for a network technician to further troubleshoot the issue, in step S316.

Accordingly, the present invention adaptively resetting customer-facing portions of a network element, or resetting a network element based on correlating customer reports.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission, application messaging and data storage represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of automating event detection in a communications network, comprising:
    correlating reports, issued by users experiencing at least one of an outage and a performance degradation for a service provided by a service provider, to identify a network element associated with the at least one of the outage and the performance degradation;
    determining whether a predetermined threshold is crossed based on the reports;
    adaptively resetting a customer-facing portion of the network element associated with the reports, based on determining whether the predetermined threshold is crossed;
    retesting the network element to determine whether an issue associated with the at least one of the outage and the performance degradation is resolved; and
    creating a network ticket when the retesting results in a determination that the issue associated with the at least one of the outage and the performance degradation is not resolved.

2. The method according to claim 1,
wherein the service comprises providing network connectivity.

3. The method according to claim 1,
wherein the reports are received via at least one of: the Internet, postal mail, a public switched telephone network and an intranet.

4. The method according to claim 1,
wherein the customer-facing portion of the network element comprises a customer interface card.

5. The method according to claim 1,
wherein the network element comprises at least one of: a digital subscriber line access multiplexer, a router, a switch and an interface device between a public switched telephone network and a packet switched data network.

6. The method according to claim 1,
wherein the predetermined threshold specifies a number of customers that do not experience the at least one of the outage and the performance degradation for the service provided by the service provider.

7. The method according to claim 1,
wherein the predetermined threshold specifies a number of the reports that specify an issue falling within a defined criteria.

8. The method according to claim 1,
wherein the predetermined threshold specifies a number of customers that experience the at least one of the outage and the performance degradation for the service provided by the service provider.

9. The method according to claim 1, further comprising:
applying logic based on the reports.

10. The method according to claim 9,
wherein the logic specifies a configuration of at least one of the customer-facing portion of the network element and the network element.

11. The method according to claim 9,
wherein the logic determines whether a type of issue causing the at least one of the outage and the performance degradation is related to at least one of hardware or software.

12. The method according to claim 9, further comprising:
implementing a course of action based on at least one of the predetermined threshold and the logic.

13. The method according to claim 12,
wherein the course of action comprises waiting for a time period prior to adaptively resetting the customer-facing portion of the network element associated with the reports.

14. The method according to claim 12,
wherein the course of action comprises obtaining a snapshot of at least one of the customer-facing portion of the network element and the network element.

15. The method according to claim 14,
wherein the snapshot comprises at least one of: a configuration for the network element, a configuration for the customer-facing portion of the network element, memory values for the network element, memory values for the customer-facing portion of the network element, register values for the network element, register values for the customer-facing portion of the network element, performance parameters for the network element, performance parameters for the customer-facing portion of the network element, error counts for the network element and error counts for the customer-facing portion of the network element.

16. The method according to claim 1, further comprising:
adaptively resetting the network element.

17. A system for automating event detection in a network element in a communications network, comprising:
    a correlator that correlates reports, issued by users experiencing at least one of an outage and a performance degradation for a service provided by a service provider, to identify a network element associated the at least one outage and performance degradation;
    a business rule automator that determines whether a predetermined threshold is crossed based on the reports;
    a resetter that adaptively resets a customer-facing portion of the network element associated with the reports, based on determining whether the predetermined threshold is crossed; and
    a tester that retests the network element to determine whether an issue associated with the at least one of the outage and the performance degradation is resolved,
    wherein a network ticket is created when the retesting results in a determination that the issue associated with the at least one of the outage and the performance degradation is not resolved.

18. At least one non-transitory computer readable medium, storing a computer program recorded on the at least one non-transitory computer readable medium, for automating event detection in a communications network, comprising:
- a correlating code segment, recorded on the at least one non-transitory computer readable medium, that correlates reports, issued by users experiencing at least one of an outage and a performance degradation for a service provided by a service provider, to identify a network element associated with the at least one of the outage and the performance degradation;
- a determining code segment, recorded on the at least one non-transitory computer readable medium, that determines whether a predetermined threshold is crossed based on the reports;
- a resetting code segment, recorded on the at least one non-transitory computer readable medium, that adaptively resets a customer-facing portion of the network element associated with the reports, based on determining whether the predetermined threshold is crossed;
- a retesting code segment, recorded on the at least one non-transitory computer readable medium, that retests the network element to determine whether an issue associated with the at least one of the outage and the performance degradation is resolved; and
- a creating code segment, recorded on the at least one non-transitory computer readable medium, that creates a network ticket when the retesting results in a determination that the issue associated with the at least one of the outage and the performance degradation is not resolved.

* * * * *